(12) United States Patent
Moskovchenko

(10) Patent No.: US 9,525,811 B2
(45) Date of Patent: Dec. 20, 2016

(54) DISPLAY DEVICE CONFIGURED AS AN ILLUMINATION SOURCE

(71) Applicant: QUALCOMM Incorporated, San Diego, CA (US)

(72) Inventor: Stepan N. Moskovchenko, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 13/932,844

(22) Filed: Jul. 1, 2013

(65) Prior Publication Data

US 2015/0002735 A1 Jan. 1, 2015

(51) Int. Cl.
| | | |
|---|---|---|
| *H04N 5/222* | (2006.01) | |
| *H04N 9/73* | (2006.01) | |
| *H04N 5/225* | (2006.01) | |
| *H04N 5/235* | (2006.01) | |
| *H04N 21/4223* | (2011.01) | |
| *H04N 21/431* | (2011.01) | |
| *H04N 21/4788* | (2011.01) | |
| *H04N 21/485* | (2011.01) | |
| *H04N 7/14* | (2006.01) | |

(52) U.S. Cl.
CPC .......... *H04N 5/2256* (2013.01); *H04N 5/2354* (2013.01); *H04N 7/142* (2013.01); *H04N 9/73* (2013.01); *H04N 21/4223* (2013.01); *H04N 21/4318* (2013.01); *H04N 21/4788* (2013.01); *H04N 21/4854* (2013.01); *H04N 2007/145* (2013.01)

(58) Field of Classification Search
CPC .... H04N 5/235; H04N 5/2352; H04N 5/2354; H04N 5/2256; H04N 5/23293; G03B 15/02; G03B 7/16; G03B 15/05; G03B 15/04; G06K 9/2027; G06K 2209/401
USPC ...................... 348/333.01–333.13, 370, 371, 333.11,348/333.12, 223.1, 225.1, 222.1
See application file for complete search history.

(56) References Cited

U.S. PATENT DOCUMENTS 7,663,691 B2   2/2010 Ciudad et al.
7,738,032 B2 * 6/2010 Kollias et al. ................ 348/370
(Continued)

FOREIGN PATENT DOCUMENTS

WO    2012099505 A1   7/2012
WO    2012103554 A2   8/2012

OTHER PUBLICATIONS

International Search Report and Written Opinion—PCT/US2014/038991—ISA/EPO—Aug. 25, 2014.
(Continued)

*Primary Examiner* — Chia-Wei A Chen
(74) *Attorney, Agent, or Firm* — Paradice and Li LLP

(57) ABSTRACT

The disclosed technology relates to an electronic device configured to use the device's own display to provide an illumination source for front-facing image sensors and to a method of using the same. An electronic device for capturing a digital image using a front-facing image sensor and a digital display device includes a command input module configured to receive a command to capture the digital image, an illumination adjustment module configured to adjust the display device to an imaging illumination condition in response to the command, and a front-facing image sensor module configured capture the digital image using the front-facing image sensor under the predetermined illumination condition.

39 Claims, 13 Drawing Sheets

(56) References Cited

U.S. PATENT DOCUMENTS

| | | | |
|---|---|---|---|
| 8,139,122 B2* | 3/2012 | Rolston | 348/222.1 |
| 8,238,968 B1 | 8/2012 | Frydman | |
| 8,248,519 B2 | 8/2012 | Liao | |
| 8,400,519 B2* | 3/2013 | Choi | 348/222.1 |
| 8,625,023 B2* | 1/2014 | Rolston | 348/371 |
| 8,695,610 B2* | 4/2014 | Samain et al. | 132/200 |
| 2001/0013897 A1* | 8/2001 | Kowno et al. | 348/240 |
| 2002/0071246 A1* | 6/2002 | Stewart | 361/681 |
| 2003/0045916 A1* | 3/2003 | Anderson et al. | 607/89 |
| 2003/0086703 A1* | 5/2003 | Kollias et al. | 396/14 |
| 2003/0098922 A1* | 5/2003 | Barkan | H04N 5/2351 348/362 |
| 2004/0125996 A1* | 7/2004 | Eddowes et al. | 382/128 |
| 2004/0146290 A1* | 7/2004 | Kollias et al. | 396/14 |
| 2004/0239799 A1* | 12/2004 | Suzuki et al. | 348/370 |
| 2005/0146863 A1* | 7/2005 | Mullani | 362/140 |
| 2007/0081094 A1* | 4/2007 | Ciudad | H04N 5/2354 348/371 |
| 2008/0231742 A1* | 9/2008 | Kurase | G03B 15/02 348/333.01 |
| 2008/0307307 A1* | 12/2008 | Ciudad | G06T 13/80 715/719 |
| 2010/0013943 A1* | 1/2010 | Thorn | H04N 5/232 348/222.1 |
| 2010/0073497 A1* | 3/2010 | Katsumata | G06K 9/00315 348/211.99 |
| 2010/0118179 A1* | 5/2010 | Ciudad | H04N 5/2354 348/371 |
| 2010/0149398 A1* | 6/2010 | Gayer | 348/333.01 |
| 2010/0194961 A1* | 8/2010 | Patel | H04N 5/20 348/333.01 |
| 2010/0265228 A1 | 10/2010 | Kimura et al. | |
| 2011/0115833 A1* | 5/2011 | Shimoyama | 345/690 |
| 2011/0317988 A1* | 12/2011 | Lee | G03B 7/16 396/61 |
| 2012/0013779 A1* | 1/2012 | Hattery | A61B 5/0059 348/302 |
| 2012/0243200 A1* | 9/2012 | Sutton | G03B 15/02 362/11 |
| 2012/0249855 A1* | 10/2012 | Ciudad | H04N 5/2354 348/333.01 |
| 2012/0294600 A1* | 11/2012 | Osawa | G03B 7/08 396/164 |
| 2013/0015946 A1* | 1/2013 | Lau | G07C 9/00 340/5.2 |
| 2013/0038771 A1* | 2/2013 | Brunner | H04N 5/144 348/333.01 |
| 2013/0162862 A1* | 6/2013 | Zhao et al. | 348/223.1 |
| 2013/0170743 A1* | 7/2013 | Finlayson | G06K 9/34 382/164 |
| 2013/0201653 A1* | 8/2013 | Shoemake | G03B 15/02 362/3 |
| 2014/0289534 A1* | 9/2014 | Parry et al. | 713/186 |
| 2014/0313303 A1* | 10/2014 | Davis et al. | 348/77 |
| 2014/0337930 A1* | 11/2014 | Hoyos et al. | 726/4 |
| 2015/0181101 A1 | 6/2015 | Ciudad et al. | |

OTHER PUBLICATIONS

Ma T-Y. et al., "Automatic Brightness Control of the Handheld Device Display with Low Illumination", 2012 IEEE International Conference on Computer Science and Automation Engineering (CSAE), May 25-27, 2012, Zhangjiajje, China, vol. 2, May 25, 2012, May 27, 2012, pp. 382-385, XP002728351, Proceedings of the 2012 IEEE International Conference on Computer Science and Automation Engineering (CSAE) IEEE Piscataway, NJ, USA, ISBN: 978-1-4673-0089-6.

* cited by examiner

DISPLAY DEVICE CONFIGURED AS AN ILLUMINATION SOURCE

BACKGROUND OF THE INVENTION

Field of the Invention

The disclosed technology relates to an electronic device configured to use the device's own display to provide an illumination source for front-facing image sensors. Aspects are also directed to methods of using the same.

Description of the Related Art

Many digital devices are equipped with a front-facing image sensor for capturing self-images of a user. However, most of the devices equipped with front-facing image sensors lack a dedicated illumination source to provide additional illumination for capturing the self-image using the front-facing image sensor in a low-light environment. In many cases, the benefit of adding such an illumination source does not outweigh the added technological complexity and the associated cost of having a dedicated illumination source for the digital devices having front-facing image sensors.

SUMMARY OF THE INVENTION

In one aspect, a method for capturing a digital image using an electronic device having a front-facing image sensor and a digital display includes receiving a command to capture the digital image, adjusting the digital display to an imaging illumination condition in response to the command, and capturing the digital image using the front-facing image sensor under the imaging illumination condition.

In another aspect, a digital image-capturing system includes a command input module configured to receiving a command to capture the digital image, an illumination adjustment module configured to adjust the digital display to an imaging illumination condition in response to the command, and a front-facing image sensor module configured to capture the digital image using the front-facing image sensor under the predetermined illumination condition.

In another aspect, a computer-readable medium comprising instructions that when executed cause a processor to perform the following steps include receiving a command to capture the digital image, adjusting the digital display to an imaging illumination condition in response to the command, and capturing the digital image using the front-facing image sensor under the imaging illumination condition.

In yet another aspect, a digital image-capturing system includes a command input module configured to receiving a command to capture the digital image, an illumination adjustment module configured to adjust the digital display to an imaging illumination condition in response to the command, and a front-facing image sensor module configured to capture the digital image using the front-facing image sensor under the predetermined illumination condition.

DETAILED DESCRIPTION

Many digital devices come with a front-facing image sensor for capturing self-images a user. The captured self-image may be a static image such as a photograph, or may be a dynamic image such as a video. However, most if not all devices with front-facing cameras lack a dedicated illumination source (e.g., a flash or LED light for capturing still images or video). As a result, when using the front-facing image sensor in a low-light environment, the illumination from ambient light may not be sufficient to provide adequate illumination for the image sensor. While adding a flash or an LED source can provide a solution, the benefit of adding such an illumination source does not outweigh the added technological complexity and the associated cost of having a dedicated illumination source for a front-facing camera on the digital devices. Thus, there is a need for a cost-effective illumination source for capturing images using the front-facing image sensor of a digital device.

The disclosure is directed to an electronic device having a front-facing image sensor and a digital display, where the electronic device is configured to use the digital display as an illumination source for the front-facing image sensor. Aspects are also directed to methods of using the same. One advantage of the system described herein is that it improves the low-light performance of the front-facing image sensor of the electronic device without incurring the added costs or complexity of an additional illumination source.

Thus, one embodiment is an electronic device that is configured to illuminate the digital display as an image is being captured by a front facing camera. The user may activate the front facing camera to capture an image, and this would cause the digital display to flash a bright white color while the image is being captured. In another aspect, the digital display may brighten to a predefined brightness, or to a predefined color, as the image is being captured. This feature may allow the user to choose how the digital display is used to improve a low-light capture of images from the front camera.

The following disclosure may describe the features of various embodiments of a digital device having a front-facing image sensor and a display device configured as an illumination source in the context of one type of device (e.g., a smart phone). However, it is to be understood that other embodiments are possible, including any suitable electronic devices that can be configured to have a front-facing image sensor and a display device configured as an illumination source. Such devices include, for example, mobile phones, tablet computers, notebook computers, desktop computers, video cameras, portable music players, among others. In addition, the display device that may provide this function include an LED, LCD, OLED, AMOLED, or other similar types of displays that can be configured as an illumination source for a front-facing image sensor of a digital device.

Figure 1A:
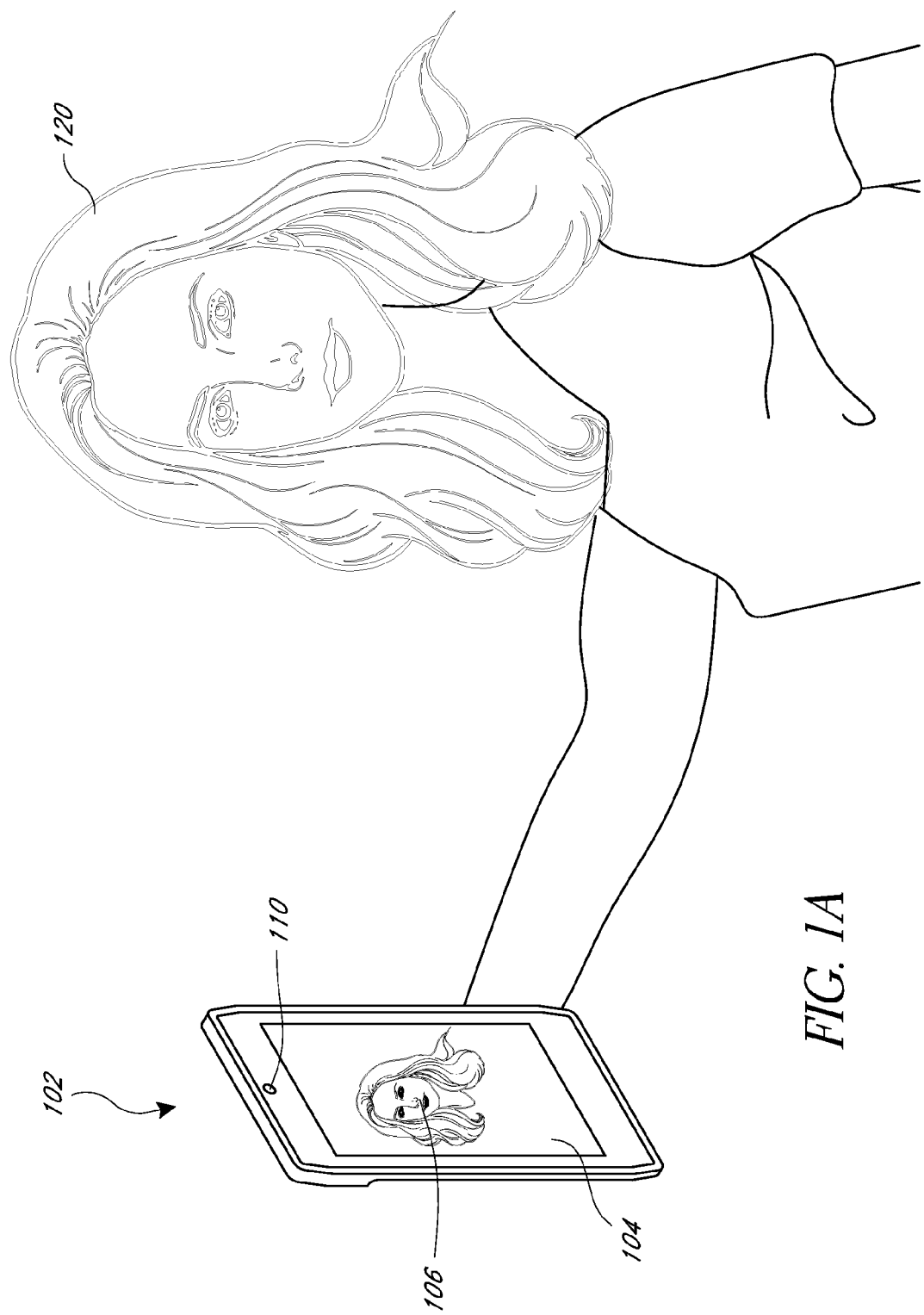
FIG. 1A is a perspective view that illustrates a typical digital device with a front-facing image sensor and a user using the digital device to capture a self-image or a self-video according to one embodiment.

FIG. 1A illustrates a digital device 102 with a front-facing image sensor 110 and a user 120 using the digital device to capture a self-image or a self-video according to one embodiment. As discussed above, the illustrated digital device 102 may be a tablet or a smart phone, although aspects are not limited thereto. The digital device 102 includes a display device 104 that displays images of what is captured through the front-facing image sensor 110. In the illustrated embodiment, the display device 104 is configured to display an illumination image 106, which includes a self-image of the user 120 in this example. The self-image of the user as an illumination image 106 captured by the front-facing image sensor 110 may be captured in response to a command by the user 120.

As described herein, an "image" may refer to not only a still digital image as but may also refer to a video comprising instantaneous frames of many images. In addition, an image can refer to images displayed on the display device 104, or images that exist in a memory device or storage device of the digital device 102 but not displayed on the display device 104.

As shown, the user 120 would begin an image capture mode with the digital device 102 wherein an illumination image 106 would be displayed. The user 120 could then activate a shutter button to capture the image at a particular point. As the shutter button is activated, the digital device 102 would instruct the display device 104 to flash a bright white color that would better illuminate the user 120. This would improve the image being captured by adding additional light onto the user 120.

Figure 1B:
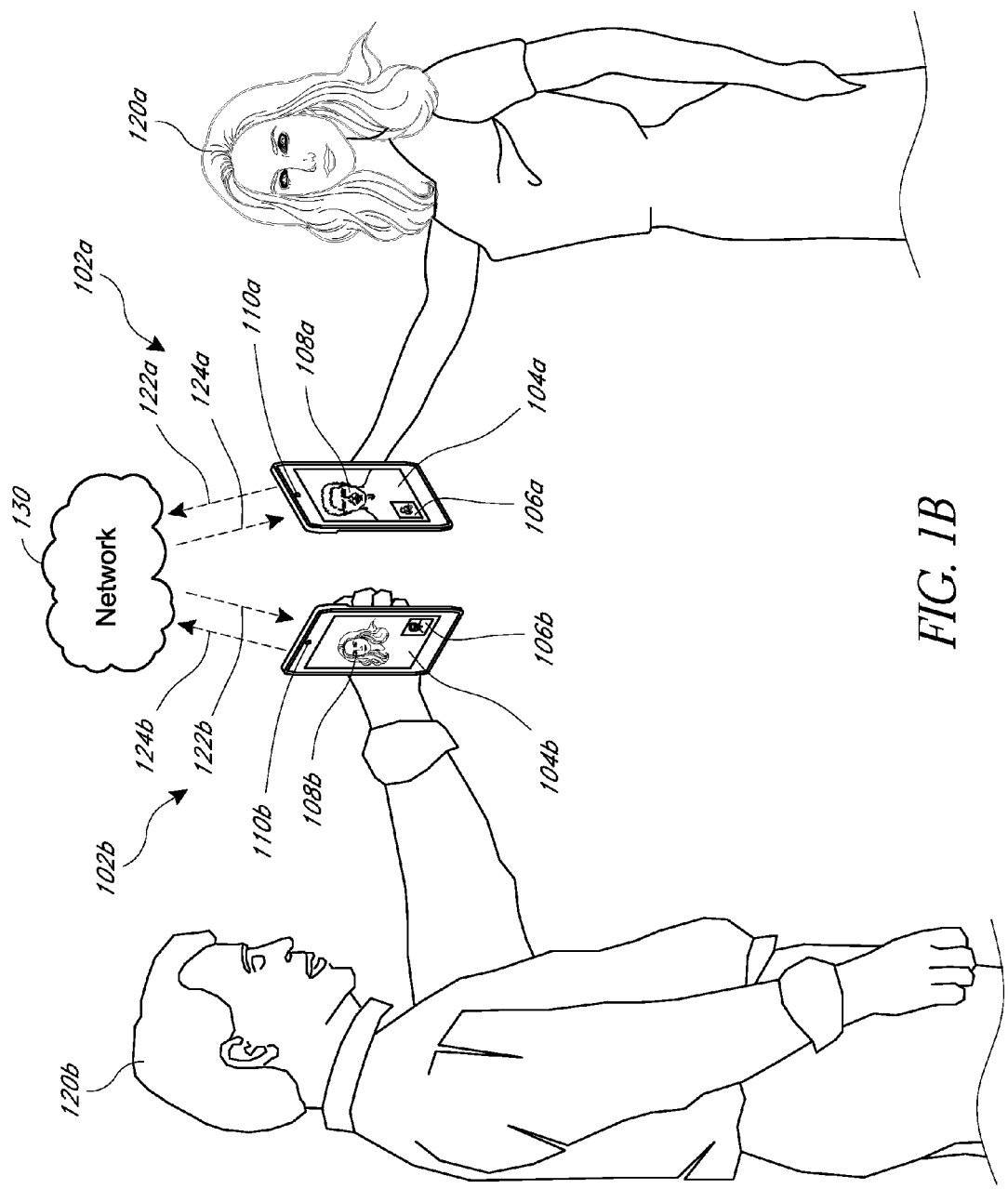
FIG. 1B is a perspective view that illustrates typical digital devices with front-facing image sensors and multiple users using the digital devices to exchange images or videos through a network according to another embodiment.

FIG. 1B illustrates digital devices with front-facing image sensors and multiple users using the digital devices to exchange images or videos through a network according to another embodiment. The digital device 102A in use by a first user 120A includes a first front-facing image sensor 110A and a first display device 104A configured to display a first illumination image. In this example, the illumination image includes a self-image 106A of the first user 102A captured by the first front-facing image sensor 110A in response to a command by the first user 120A. Analogously, the digital device 102B in use by a second user 120B includes a second front-facing image sensor 110B and a second display device 104B configured to display a second illumination image. In this example, the second illumination image includes a second self-image 106B of the second user 102B captured by the second front-facing image sensor 110B in response to a command by the second user 120B.

During use, such as a video call, the first display device 104A may be configured to brighten as the user 120*a* is in the call. This brightening would allow the system to transmit a higher quality image to the second user 120*b*. Similarly, the second display device 104*b* could be configured to brighten while the second user 120*b* was on a video call.

A digital device with a front-facing image sensor such as the first and second digital devices 102A and 102B of FIG. 1B can also be configured to convert electrical signals generated by image sensors in response to detected photons into electromagnetic signals and transmit the electromagnetic signals. The digital device can further be configured to receive similar electromagnetic signals generated by another device communicatively coupled to the digital device. For example, in the illustrated embodiment of FIG. 1B, the first digital device 102A may be configured to convert electrical signals corresponding to the first self-image 106A, generated in response to photons detected by the first image sensor 110A, and convert the electrical signals into first upload electromagnetic signal 122A. The information contained in the first upload electromagnetic signal 122A can in turn be received by the second digital device 102B configured to receive first download electromagnetic signal 122B through the network 130 and convert the first download electromagnetic signal 122B into electrical signals, which is then displayed as a first communicated image 108B. The first communicated image 108B in this example corresponds to the first self-image 106A captured by the first image sensor 110A. Analogously, the second digital device 102B can be configured to convert electrical signals corresponding to the second self-image 106B, generated in response to detected photons by the second image sensor 110B, and convert the electrical signals into second upload electromagnetic signal 124B. The information contained in the second upload electromagnetic signal 124B can in turn be received by the first digital device 102A configured to receive second download electromagnetic signal 124A through the network 130 and convert the second download electromagnetic signal 124A into electrical signals, which is then displayed as a second communicated image 108A corresponding to the second self-image 106B captured by the second image sensor 110B.

Figure 2:
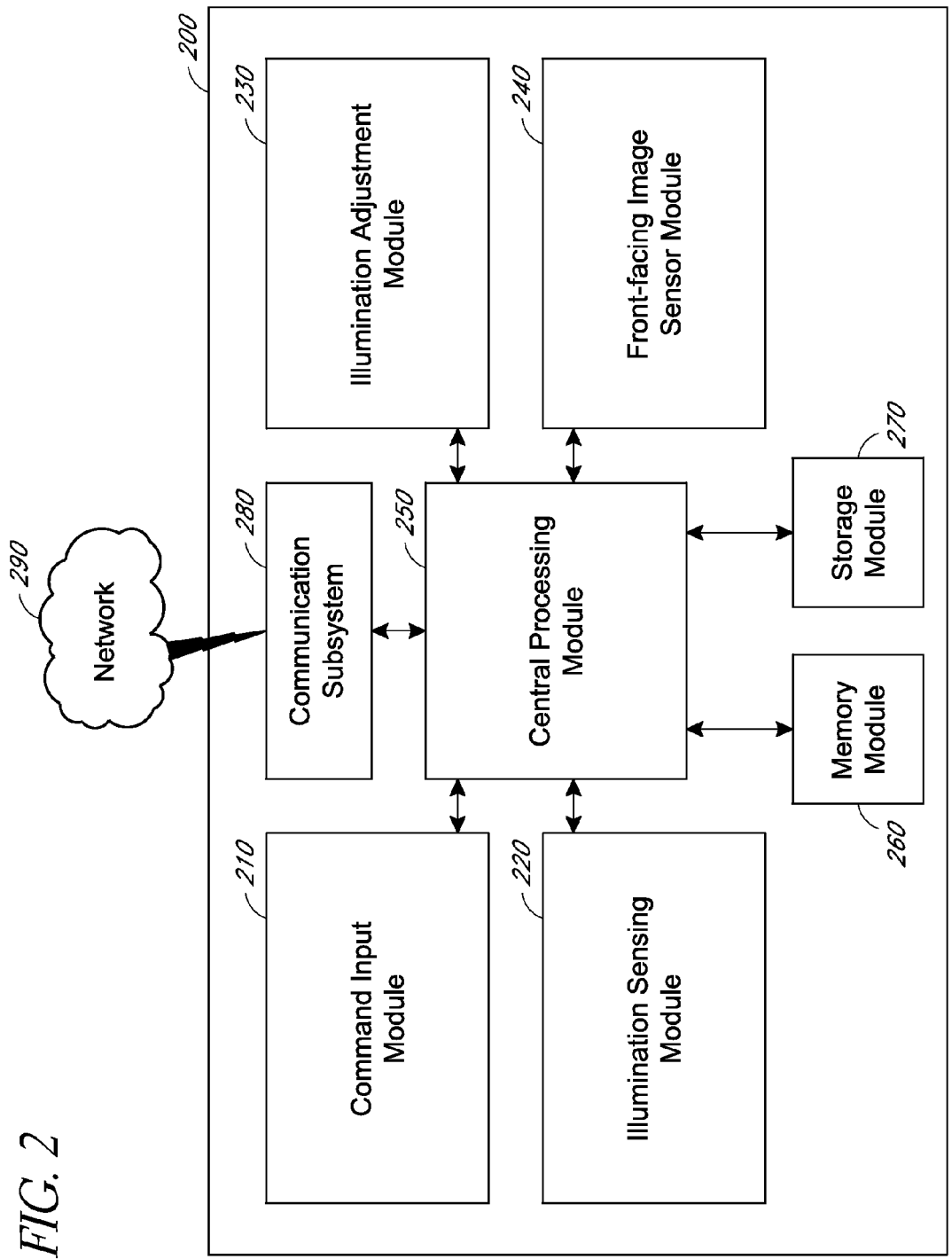
FIG. 2 is a functional block diagram illustrating a digital device comprising a front-facing image sensor and a display device configured as an illumination source according to one embodiment.

FIG. 2 is a functional block diagram illustrating a digital device 200 with a front-facing image sensor and a display device configured as an illumination source, such as a smart phone, according to one embodiment. The digital device 200 includes a command input module 210, an illumination sensing module 220, an illumination adjustment module 230, and a front-facing image sensor module 240. Each of the command input module 210, the illumination sensing module 220, the illumination adjustment module 230, and the front-facing image sensor module 240 are communicatively connected to a central processing module 250. The digital device 200 further includes a memory module 260 and a storage module 270 communicatively connected to the central processing module 250. The digital device 200 further includes a communication subsystem 280 configured to communicatively connect the digital device 200 to a network 290.

The illustrated digital device 200 includes the central processing module 250 configured to control the overall operation of the digital device 200 and may include a suitable microprocessor configured to perform processing functions of the digital device 200. In some embodiments, the central processing module 250 includes specialized sub-processing modules such as a graphics processing module.

The digital device 200 further includes the command input module 210 configured to receive various modes of command input from a user. In some embodiments, the command input module 210 can include any number of suitable input devices such as a voice recognition device, a gesture recognition device, a motion sensing device, a touch screen device, a keyboard device, and an auxiliary input/output (I/O) device, among others. The command input module can also include supporting circuitry to transform physical input signals such as a voice wave or a motion into digital signals.

The digital device 200 further includes the illumination sensing module 220 configured to determine an illumination condition. The illumination sensing module 220 comprises the front-facing image sensor and an image sensor controller. The image sensor includes a plurality of pixels configured to convert incident photons into electrical signals, which are transferred to the central processing module to be processed. In a typical image sensor, each pixel includes a photosensitive area, which is configured to absorb incident photons of light. In some embodiments, incident photons may be directed by a micro lens over each pixel to enhance the quantum efficiency of photon collection. The absorbed photons are converted into electrons, whose number may depend on the energy of the incident photon. The electrons are in turn converted to a voltage signal.

In some embodiments, the image sensor includes a charge-coupled device (CCD) image sensor. A CCD image sensor comprises a color filter array and a pixel array. Each pixel of a CCD image sensor includes a color filter comprising a pattern of red, green and blue filters. In one example, the color filter may be arranged in a Bayer filter pattern having a 2×2 checker board color filter pattern. The 2×2 checkerboard filter pattern of a Bayer filter includes one red and one blue filters disposed diagonally to one another and two green filters disposed diagonally to one another. The filtered photons passing through different color filters are then absorbed by a photodiode within the pixel array. The photodiode converts the absorbed photons into a charge, and the charge is moved to a single location by applying different voltages to pixels, in a process called charge-coupling. Because the charge in the pixel is moved by applying different voltages, CCD image sensors are supported by external voltage generators.

In some embodiments, the image sensor includes a complementary metal oxide semiconductor (CMOS) image sensor. Like CCD image sensors, CMOS image sensors include an array of photo-sensitive diodes, one diode within each pixel. Unlike CCDs, however, each pixel in a CMOS imager has its own individual integrated amplifier. In addition, each pixel in a CMOS imager can be read directly in an x-y coordinate system, rather than through movement of a charge. Thus, a CMOS image sensor pixel detects a photon directly and converts it to a voltage, which is outputted.

The illumination sensing module 220 includes additional circuitry for converting the outputted voltages resulting from an incident photon into digital information, which may be processed by the central processing module 250. The illumination sensing module 220 further includes an image sensor controller configured to control the image sensor in response to various commands from the central processing module 250.

The illumination adjustment module 230 may be configured to adjust the illumination conditions of the display device to and from an imaging illumination condition and a normal viewing illumination condition, in response to a command received from a user. The illumination adjustment module includes the display device and a display controller. In one embodiment, the display device can include an active matrix organic light-emitting diode (AMOLED) display comprising an active matrix of organic light-emitting diode (OLED) pixels that generate light upon electrical activation. The OLED pixels can be integrated onto a thin film transistor (TFT) array, which functions as a series of switches to control the current flowing to each individual pixel. Other embodiments of the display device are possible, including an LED, LCD, OLED, AMOLED, or any other similar types of displays that can be configured as an illumination source for a front-facing image sensor of the digital device 200.

The light emission intensity and therefore the luminance of each pixel within a display can be adjusted by the current supplied to a emitting element, such as a light-emitting diode (LED). In one implementation, the display is an active matrix display such as an AMOLED, whose pixels comprise two transistors and a capacitor. A first transistor whose drain is connected to a light emitting diode (e.g., OLED) is configured to control the amount of current flowing through the diode and therefore the light emission intensity by controlling a gate-source voltage of the first transistor. The gate-source voltage is in turn maintained by the capacitor connected between the gate and the source of the first transistor. The gate-source voltage can be modified by controlling the amount of charge stored in the capacitor through controlling a second transistor, whose gate is connected to a row select line and whose source is connected to a data line. Thus, by controlling various voltages such as the row select line voltage and the data line voltage to control the second transistor, which in turn controls the current delivered to the light emitting diode through the first transistor, the luminance value of each pixel in the display device can be adjusted to provide varying degrees of illumination for the front-facing image sensor.

The front-facing image sensor module 240 is configured to capture the digital image through the front-facing image sensor under the image illumination condition. The front-facing image sensor module can include and share similar hardware devices as the illumination sensing module. For example, the front-facing image sensor module 240 comprises the front-facing image sensor and an image sensor controller, whose functions and operations are substantially the same as the illumination sensing module 220. In addition, the illumination adjustment module performs calculations necessary to determine various illumination conditions for the display device of the illumination adjustment module 230.

The digital device 200 further includes the memory module 260 configured to store information while the digital device 200 is powered on. The memory module 260 can include memory devices such as a static random access memory (SRAM) and a dynamic random access memory (RAM). The memory devices can be configured as different levels of cache memory communicatively coupled to the central processing module 250 through a memory bus that provides a data path for flow of data to and from the memory devices and the microprocessor. In particular, the memory module may hold image information at various stages of the operation of the digital device to provide illumination for the front-facing image sensor using the display device.

The digital device 200 further includes the storage module 270 configured to store media such as photo and video files, as well as software codes. In some embodiments, the storage module 270 is configured to permanently store media even when the digital device 200 is powered off. In some implementations, the storage module 270 includes storage media, such as a hard disk, a nonvolatile memory such as flash memory, read-only memory (ROM), among others.

The digital device 200 further includes the communication subsystem 280 configured to communicatively connect the digital device 200 to the network 290. The communication subsystem 280 includes circuitry configured for wireless communication. For example, the communication subsystem 280 may enable Wi-Fi® communication between the digital device 200 and the network 290 using one of 802.11 standards. The communication system 280 may additionally enable standards such as BLUETOOTH®, Code Division Multiple Access® (CDMA), and Global System for Mobile Communication® (GSM), among others.

FIGS. 3A-3D are flow charts illustrating a method 300 of using a digital device with a front-facing image sensor and a display device configured as an illumination source according to one embodiment. The method includes receiving a command to capture the digital image, adjusting the display device to an imaging illumination condition in response to the command, and capturing the digital image using the front-facing image sensor under the imaging illumination condition.

The digital device of the illustrated embodiments in FIGS. 3A-3D may be a digital device such as the digital device 200 of FIG. 2 with a front-facing image sensor and a display device configured as an illumination source according to one embodiment.

The method 300 of using a digital device with a front-facing image sensor and a display device configured as an illumination source begins at a start state 310 and moves to a state 320 to receive a command to capture a digital image using the front-facing image sensor. In one aspect, the command may be received in any suitable form that can be processed by the command input module 210, including a voice command processed by a voice recognition device, a gesture command processed by a gesture recognition device, a touch command processed by a touch screen device, a keyboard command processed by a keyboard device, a motion command processed by a motion sensing device, among other suitable forms of a user command.

After receiving the command to capture the digital image at the state 320, the method 300 moves to a state 330 and activates the front-facing image sensor. In one aspect, activating the front-facing image sensor at state 330 can include, for example, providing an access voltage to the access lines of the image sensor and providing Vcc to an image sensor controller of the image sensor module 220.

An illumination condition provided by the display device can be defined by many parameters, including luminance and chrominance values of the pixels of the display device. For example, as a person having ordinary skill in the art will understand, the actual values of luminance and chrominance depend on the color space being used to describe them. For example, in RGB or sRGB color spaces, each pixel can have a relative luminance Y represented by the equation Y=rR+gG+bB, where R, G, and B represent color components red, green and blue and r, g, b are constants. For example, in sRGB space, the constants r, b, and b have values 0.212, 0.7152, and 0.0722, respectively. In Y'UV color space, for example, Y' represents a luma value and U and V represent two color components. RGB space and the Y'UV space are related by the well-known transformational relationships:

$$\begin{bmatrix} Y' \\ U \\ V \end{bmatrix} = \begin{bmatrix} 0.299 & 0.587 & 0.114 \\ -0.14713 & -0.28886 & 0.436 \\ 0.615 & -0.51499 & -0.10001 \end{bmatrix} \begin{bmatrix} R \\ G \\ B \end{bmatrix} \quad (1)$$

$$\begin{bmatrix} R \\ G \\ B \end{bmatrix} = \begin{bmatrix} 1 & 0 & 1.13983 \\ 1 & -0.39465 & -0.58060 \\ 1 & 2.03211 & 0 \end{bmatrix} \begin{bmatrix} Y' \\ U \\ V \end{bmatrix} \quad (2)$$

In addition, a person skilled in the art will also understand that any suitable color space representation, such as one of YUV, YCbCr, YPbPr, etc., can be used to represent an illumination condition of the pixels of the display device. In the description herein, the term "luminance" is used generally to refer to an overall intensity of the light, and the term "chrominance" is used generally to refer to a color component.

According to one embodiment, the method 300 of using the digital device with a front-facing image sensor includes providing a dynamic illumination mode, which can be selected by the user. When activated by the user, the dynamic illumination mode allows for an optimization of the illumination condition provided by the display device based on a pre-existing illumination condition determined by the illumination sensing module. When the dynamic illumination mode is not activated by the user, a predetermined default illumination condition is provided by the display device, irrespective of the pre-existing illumination condition. Details of the illumination modes will be more apparent in the discussions that follow. After activating the front-facing image sensor at the state 330, the method 300 moves to a decision state 340 to determine whether or not a dynamic illumination mode has been activated.

When a determination is made at the decision state 340 that the dynamic illumination mode is not activated, the method 300 adjusts the display device to a default imaging illumination condition at a process state 350. Additional details on the steps performed to adjust the display device at the state 350 are discussed below with reference to FIG. 3D. The method 300 then activates an image capture shutter at a state 390.

However, when a determination is made at the decision state 340 that the dynamic illumination mode is activated, the method 300 moves to a process state 360 to determine a preexisting illumination condition. Additional information on how to determine a preexisting illumination condition can be found with reference to FIG. 3B below.

Once the preexisting illumination condition has been determined at the process state 360, the method 300 moves to a decision state 370 to determine whether additional illumination is needed. This determination may be based on the computed difference between an average luminance value of the subject and a stored luminance criteria corresponding to that subject. If the computed difference exceeds a certain threshold percentage value, the method 300 may proceed to a process state 380 to adjust the display device to an optimized imaging illumination condition. However, if the computed difference does not exceed a certain threshold percentage value, the method 300 proceeds to the process state 350 to adjust the display device to a default imaging illumination condition as discussed above.

By way of an example only, the stored target luminance criteria for a human face may include 18% in gray scale of the luminance curve. In an 8-bit luminance curve, there may be $2^8$=256 levels of luminance values such that 18% in gray scale corresponds to $46^{th}$ gray level. If the average luminance value of the human face captured in the test frame has an average luminance value corresponding to, for example, 10% in gray scale corresponding to $26^{th}$ gray level in an 8-bit luminance curve, the computed difference would be 8%. Whether the method 300 proceeds to adjusting the display device to an optimized imaging illumination condition or to adjusting the display device to a default imaging illumination condition may depend on whether or not the computed difference of 8% exceeds the threshold value in one embodiment.

After adjusting the display device to an optimized imaging illumination condition at the process state 380, the method 300 moves to the state 390 to activate the shutter. The method 300 then moves to a state 392 wherein the image or the video frame is captured while the illumination image is displayed on the display device. The method 300 then moves to a state 394 wherein the shutter is deactivated. Finally, the method 300 moves to a state 396 wherein the display device is returned to normal illumination condition.

Figure 3A:
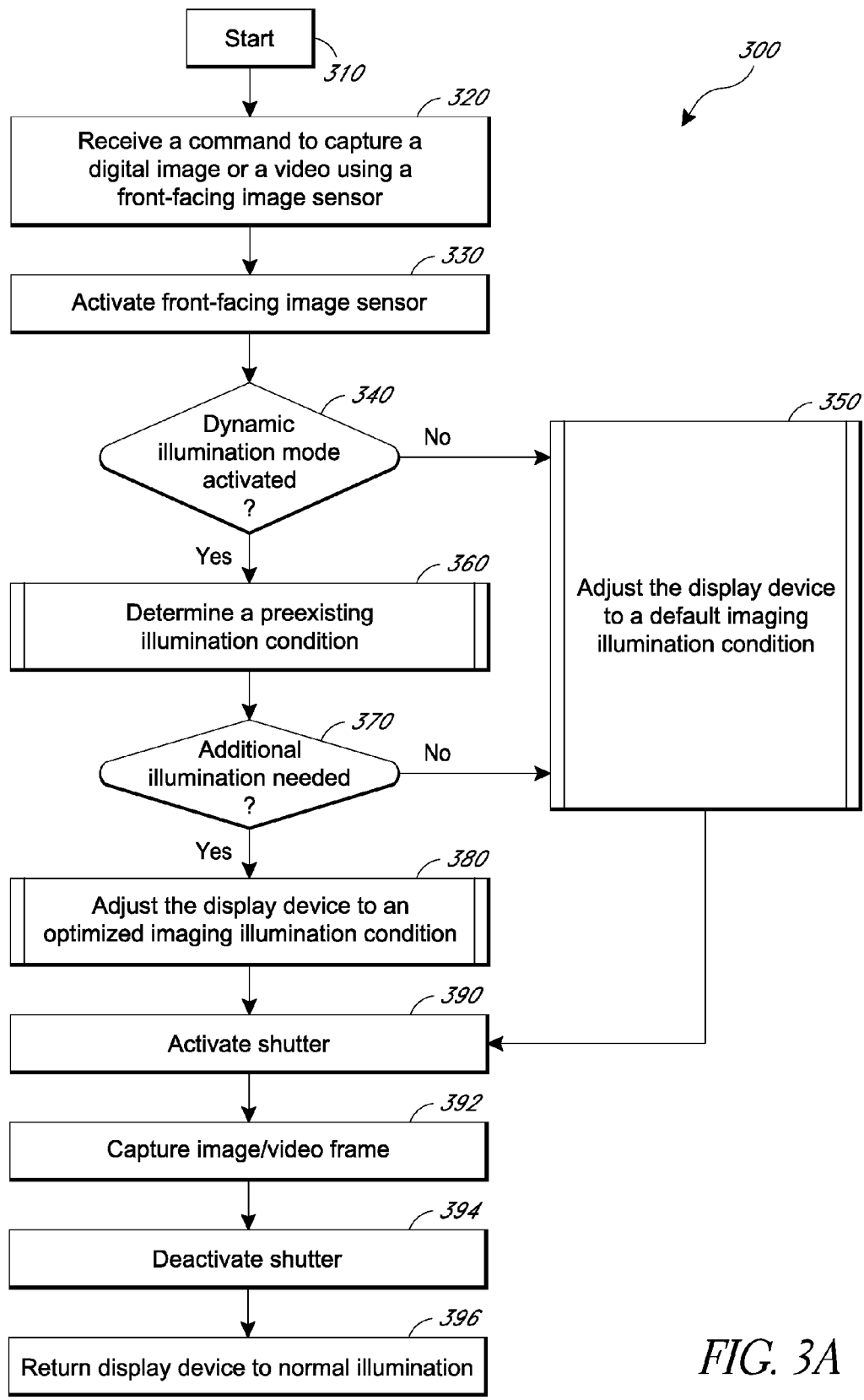
FIG. 3A is a flow chart illustrating a method of using a digital device with a front-facing image sensor and a display device configured as an illumination source according to one embodiment.
Figure 3B:
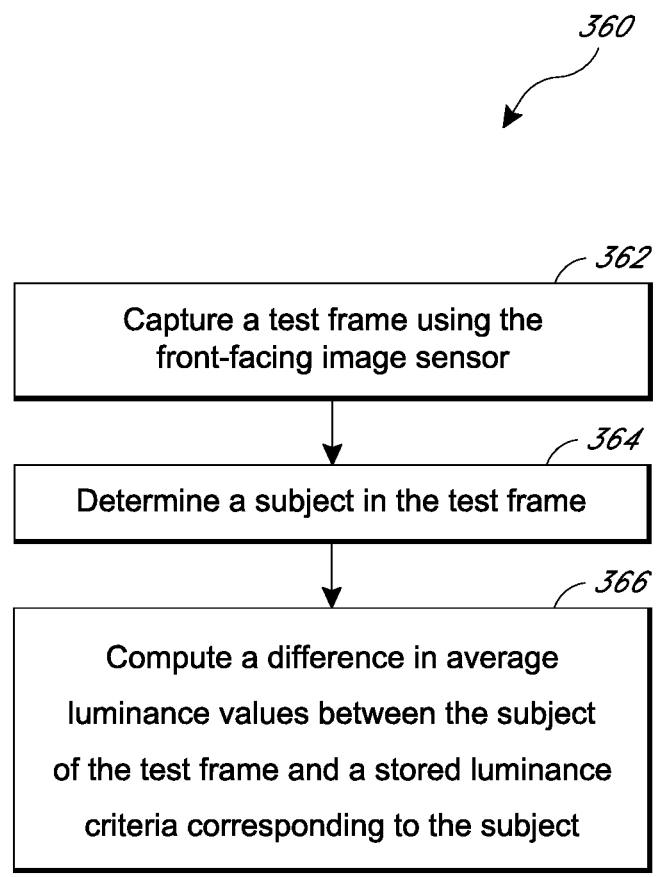
FIG. 3B is a flow chart illustrating a method of determining a preexisting illumination condition according of the embodiment of FIG. 3A.

FIG. 3B is a flow chart which provides additional details on the process 360 for determining a preexisting illumination condition according to one implementation discussed above in connection with FIG. 3A. The process 360 includes capturing a test frame using the front-facing image sensor at a state 362 and computing a difference between an average luminance value of the test frame and a stored luminance criteria at a state 366. In addition, in another implementation, the process 360 for determining a preexisting illumination condition can further include determining a subject in the test frame at a state 364. In this implementation, computing the difference at the state 366 includes computing a difference between an average luminance value of a subject of the test frame and a stored luminance criteria corresponding to the subject. For example, the subject can include a face, multiple faces, a body, multiple bodies, and a landscape, among others. Additional details of the states 362, 364, and 366 are discussed below.

According to one implementation, the process 360 for determining the preexisting illumination condition includes capturing a test frame at the state 362. A test frame may be a frame captured using a set of fixed test frame imaging conditions, including an f-number and an exposure time. In some implementations, the test frame imaging conditions include a relatively low f-number and a relatively short exposure time compared to actual imaging conditions in order to maximize speed. In other implementations, the test frame imaging conditions includes an f-number and an exposure time that are similar to actual imaging conditions.

Still referring to FIG. 3B, process 360 for determining the preexisting illumination condition according to one implementation further includes determining a subject in the test frame at the state 364. In one aspect, determining the subject can include determining a metering region and determining the subject to be imaged based on the information gathered from the metering region.

Determining the metering region may include determining a rectangular area comprising a fixed percentage of the total display area of the test frame to be the metering region. By way of an example only, the metering region may have, for example, a rectangular metering region having a width equal to about 75% of the test frame width and a length equal to about 75% of the test frame length. Other embodiments are possible, where the metering region may include a non-rectangular area and/or a rectangular area occupying different percentages of the length and/or width of the test frame.

In another aspect, determining the subject to be imaged may be based on any suitable number of subject determination criteria. In some implementations, the subject determination criteria may include determining a fraction of the total test frame area a potential subject occupies. In other implementations, the subject determination criteria may include an average luminance value of the potential subject compared to an overall average of luminance of the total test frame. In yet other implementations, the subject determination criteria may include other criteria such as an average value of the color components of the potential subject compared to an average value of the color components of the total test frame. Using one or more of the subject determination criteria and comparing against a reference list stored in the storage module, a subject of the test frame can be determined.

In another aspect, determining the subject to be imaged may include determining that the subject includes a human face. Determining that the subject is a human may invoke any one or more of face-detection algorithms known in the art. For example, the determination of a human face can be made based on any number of suitable factors, such as the ovular nature of the subject and minimum and maximum distances between the center point and the outer boundaries of the subject.

Still referring to FIG. 3B, the process 360 for determining the preexisting illumination condition according to one implementation includes computing a difference between the average luminance value of the subject of the test frame and a stored luminance criteria corresponding to that subject at the state 366.

Figure 3C:
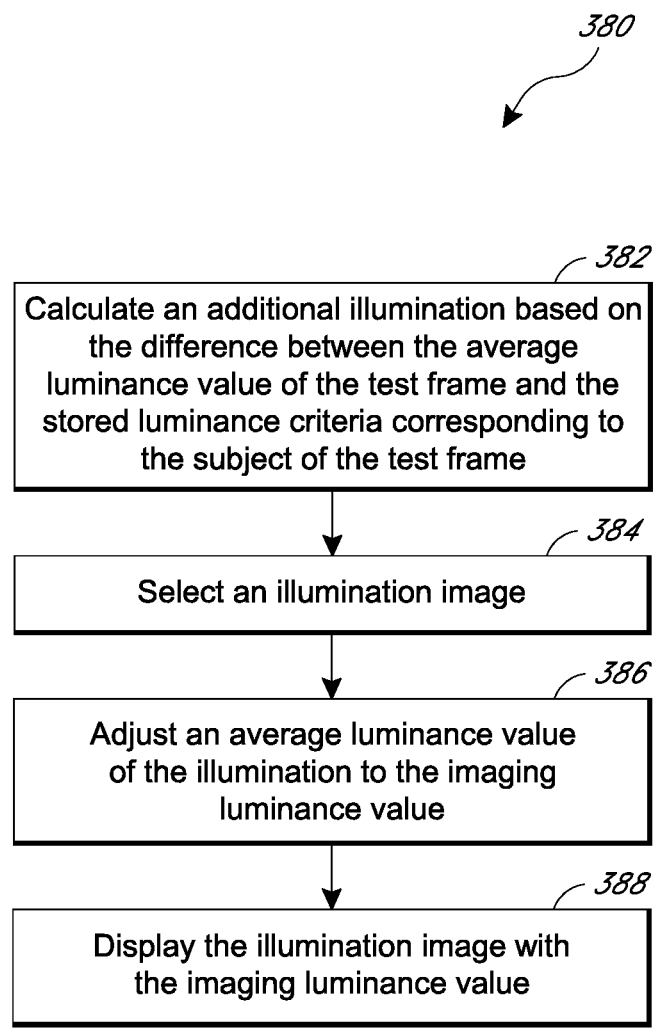
FIG. 3C is a flow chart illustrating a method of adjusting the display device to an optimized imaging illumination according of the embodiment of FIG. 3A.

FIG. 3C illustrates a flow chart which provides additional details on the process 380 for adjusting the display device to an optimized imaging illumination condition discussed above in connection with FIG. 3A. The process 380 begins at a state 382 by calculating an additional illumination based on the computed difference between the average luminance value of subject and the stored luminance criteria corresponding to the subject. The state 382 is followed by selecting an illumination image at a state 384, followed by adjusting an average luminance value at a state 386, followed by displaying the illumination image at a state 388. Each of the states 382, 384, 386, and 388 are discussed more in detail below.

In some embodiments, the calculated additional illumination in the state 382 may be linearly or nonlinearly proportional to the computed difference between the average luminance value of the subject and the stored luminance criteria corresponding to that subject in the state 366 in FIG. 3B. The calculated additional illumination to be provided by the display device may be a value obtained by, for example, multiplying the computed difference between the average luminance value of the subject and the stored luminance criteria corresponding to that subject by other factors. One such factor may be a distance factor, for example, to account for the fact that a substantial amount of light intensity can be reduced as a function of the distance between the display device and the subject being imaged.

In other embodiments, the additional illumination may be calculated based on a difference between an average chrominance value of the subject and the stored chrominance criteria corresponding to that subject in the state 382. In this embodiment, color components having relatively low average values in the subject of the test frame may be calculated to be over-compensated by the display device while other color components having relatively high average values in the subject of the test frame may be calculated to be under-compensated so as to preferentially compensate color components in order to produce an aesthetically more pleasing image.

Still referring to FIG. 3C, the process 380 for adjusting the display device additionally includes selecting an illumination image at the state 384. The selected illumination image may be any suitable image for providing the desired illumination for the front-facing image sensor.

In one implementation, the illumination image may be an image that was being displayed before receiving the command to capture the digital image in state 320 in FIG. 3A, such as a default screen of the device with optimized luminance. In another implementation, the illumination image may be an image that was being displayed immediately prior to adjusting the display device, such as a preview frame of the user's image captured by the front-facing image sensor with optimized luminance. In yet another implementation, the illumination image may be an image having illumination regions configured such that the pixels included in the illumination regions have optimized luminance and/or chrominance. Various configurations of the illumination image that can be included in selecting the illumination image in the state 384 are discussed more in detail below in connection with FIG. 4.

The illumination image may be selected in the state 384 based on the additional illumination calculated in the state 382. For example, a suitable illumination image may be the one capable of providing the calculated additional illumination at the state 382. However, not all available illumination images may be capable of providing the calculated additional illumination at the state 382. As an illustrative example, a first illumination image may have pixels arranged to provide 1-5% of additional luminance, whereas a second illumination image may have pixels arranged to provide 5-10% of additional luminance. In this illustrative example, if the required additional luminance based on the calculated additional image at the state 382 exceeds 5%, the second illumination image would be selected over the first illumination image at the state 384.

Still referring FIG. 3C, the process 380 for adjusting the display device to an optimized imaging illumination condition further includes adjusting an average luminance value of the selected illumination image to a target imaging luminance value at a state 386. Adjusting the average luminance value at the state 386 includes first determining a difference between an average luminance value of the selected illumination image and a target imaging luminance value. Upon determination of the difference, adjusting the average luminance value at the state 386 further includes determining the voltages and currents required for the pixels included in the illumination image to display the selected illumination image under the target default imaging luminance value.

Still referring FIG. 3C, the process 380 of adjusting the display device to an optimized imaging illumination condition further includes displaying the selected illumination image having the imaging luminance value at a state 388. Displaying the selected illumination image at the state 388 includes selecting the pixels of the display device corresponding to the selected illumination image and supplying the voltages and currents determined based on the difference between an average luminance value of the selected illumination image and the target imaging luminance value.

Figure 3D:
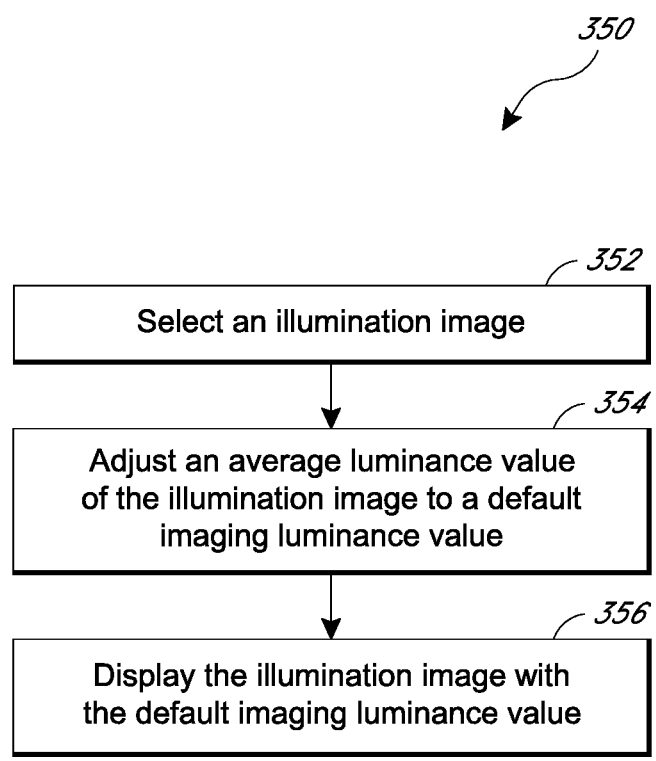
FIG. 3D is a flow chart illustrating a method of adjusting the display device to a default imaging illumination according of the embodiment of FIG. 3A.

Referring now to FIG. 3D, the process 350 of adjusting the display device to a default imaging illumination condition is explained in more detail. The process 350 begins at a state 352 to select an illumination image, followed by a state 354 where an average luminance value of the illumination image is adjusted to a default imaging luminance value. The state 354 is in turn followed by displaying the illumination image having the default imaging luminance value at a state 356. Each of the states 352, 354, and 356 are described more in detail below.

Referring to FIG. 3D, the process 350 of adjusting the display device to a default imaging illumination condition includes selecting at the state 352 an illumination image. Selecting at the state 352 an illumination image can include selecting a default illumination image. The default illumination image may be any suitable image for providing illumination for the front-facing image sensor. In one implementation, the default illumination image may be an image that was being displayed before receiving the command to capture the digital image at the state 320 in FIG. 3A. For example, the default illumination image may be any one of default screens of the display device that may include, for example, application icons. In another implementation, the default illumination image may be an image that was being displayed immediately prior to adjusting the display device. For example, the default image may be a preview frame of the user's image captured by the front-facing image sensor prior to capturing a permanent image. In another implementation, the default illumination image may be an image having an illumination area configured such that the pixels included in the illumination area have a predetermined luminance value. In some embodiments, the default illumination image can be one of predetermined images stored by the device manufacturer in the storage module of the digital device. In other embodiments, the default illumination image can be provided by the user and stored in the storage module. For example, the image can be any image stored in the storage module by the user, such a personal portrait, a web page, among others. Various configurations of the illumination image that can be included in selecting at the state 352 the illumination image are discussed more in detail below in connection with FIG. 4.

Still referring FIG. 3D, the process 350 of adjusting the display device to a default imaging illumination condition further includes adjusting at the state 354 an average luminance value of the default illumination image to a default imaging luminance value. Adjusting at the state 354 the average luminance value includes first determining a difference between an average luminance value of the selected default illumination image and a target default imaging luminance value. Upon determination of the difference, adjusting the average luminance value at the state 354 further includes determining the voltages and currents required for the pixels included in the illumination image to display the default illumination image under the target default imaging luminance value.

Still referring FIG. 3D, the process 350 of adjusting the display device to a default imaging illumination condition further includes displaying at the state 356 the default illumination image having the default imaging luminance value. Displaying the default illumination image at the state 356 includes selecting the pixels of the display device corresponding to the default illumination image and supplying the voltages and currents determined based on the difference between an average luminance value of the selected default illumination image and the target default imaging luminance value.

FIGS. 4A-4L illustrate exemplary implementations of illumination images selected in adjusting 380 the display device to an optimized imaging illumination condition and adjusting 350 the display device to a default imaging illumination condition. Each of FIGS. 4A-4L depicts an exemplary implementation of a digital device 400 comprising a front-facing image sensor 402. Although the digital device 400 depicted in FIGS. 4A-4L is a smart phone, the digital device 400 can be any one of a mobile phone, a tablet computer, a notebook computer, a desktop computer, a video camera, a portable music player, among other digital devices that can be configure to include a front-facing image sensor. In addition, in each of the embodiments illustrated in FIGS. 4A-4L, the digital device 400 is configured to display an illumination image 404. It is to be understood that each of the implementations illustrated in FIG. 4A-4L, or any features included in the implementations, can be combined to form embodiments not depicted in FIGS. 4A-4L. In addition, the number, the shapes, and the physical sizes of different features are provided as examples only, and other embodiments having a different number, different shapes, and different physical sizes are possible.

The illumination image 404 may be any suitable image displayed on the display device of the digital device 400 for providing adequate illumination for the front-facing image sensor 402. In some implementations, the illumination image 404 may be an image that was being displayed prior to receiving a command from the user to capture a digital image. One implementation of such an illumination image is depicted in FIG. 4A. The illumination image 404 of FIG. 4A is that of a default image 406. The default image 406 may include visual and interactive features such as a clock, a search window, application icons, among other features. In this implementation, upon receiving the command to capture a digital image, an average luminance value of the default image 406 may be adjusted according to adjusting 380 the display device to an optimized imaging illumination or according to adjusting 350 the display device to a default imaging illumination condition discussed above in connection with FIG. 3A.

In some implementations, the illumination image may include one or more illumination regions configured such that pixels included in the illumination regions are configured to illuminate white light. A pixel may be configured to illuminate white light when the intensities of individual color components (e.g., R, G, and B of RGB color space) are balanced to have substantially the same values such that a human eye perceives the resulting light as being neutral without having a color preference.

Figure 4B:
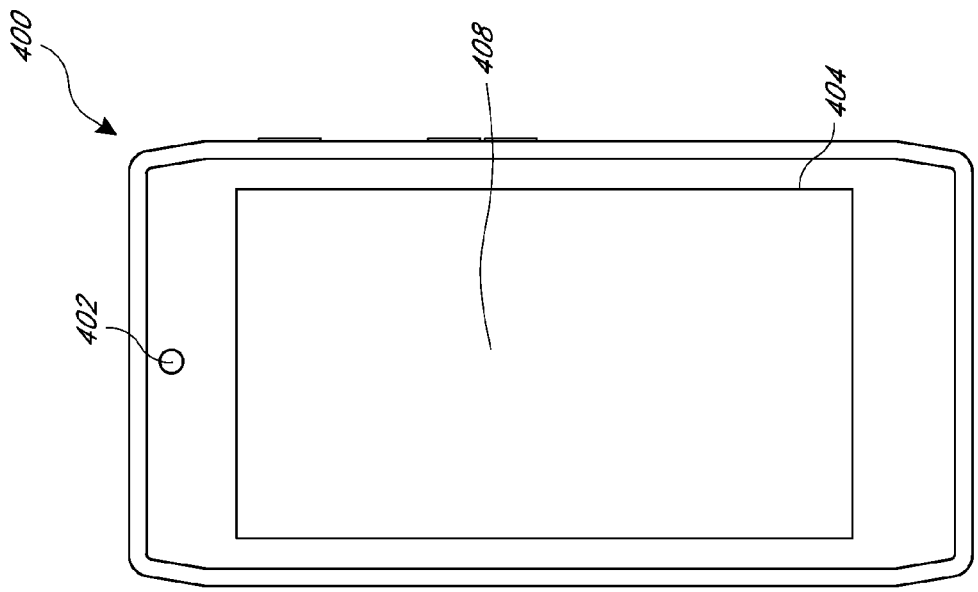
FIGS. 4A-4L are block diagrams illustrating various embodiments of illumination images displayed on the display device of a digital device having a front-facing image sensor and a display device configured as an illumination source according to one embodiment.
Figure 4A:
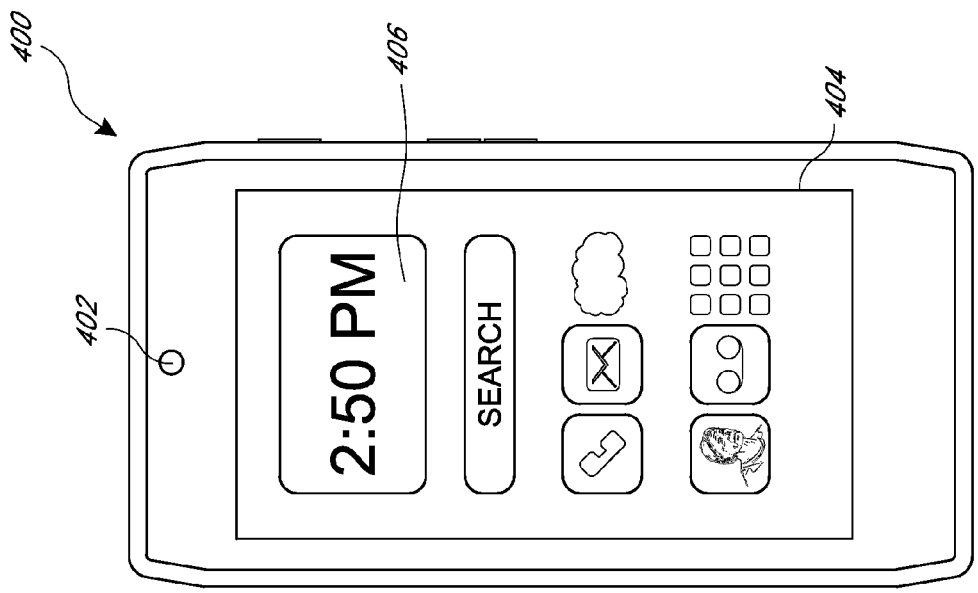

The illumination image 404 of the digital device 400 in FIG. 4B according to one implementation includes a single illumination region 408 that is configured to illuminate white light and substantially cover the entire illumination image 404. In this implementation, as in FIG. 4A, an average luminance value of the illumination region 408 may be adjusted according to adjusting 380 the display device to an optimized imaging illumination or according to adjusting 350 the display device to a default imaging illumination condition discussed above in.

Figure 4D:
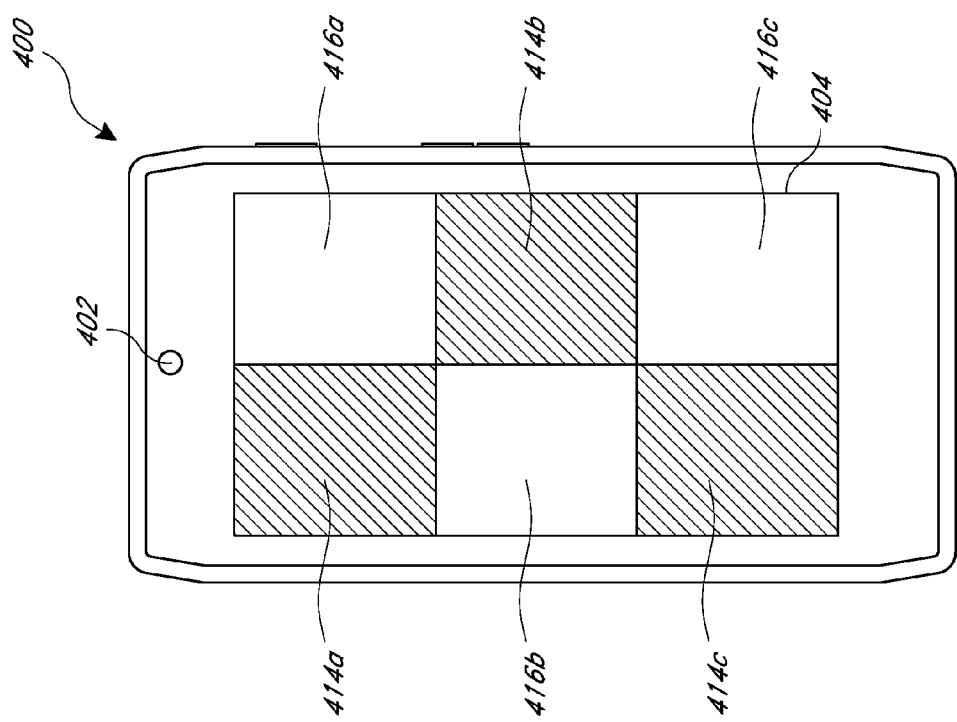
Figure 4C:
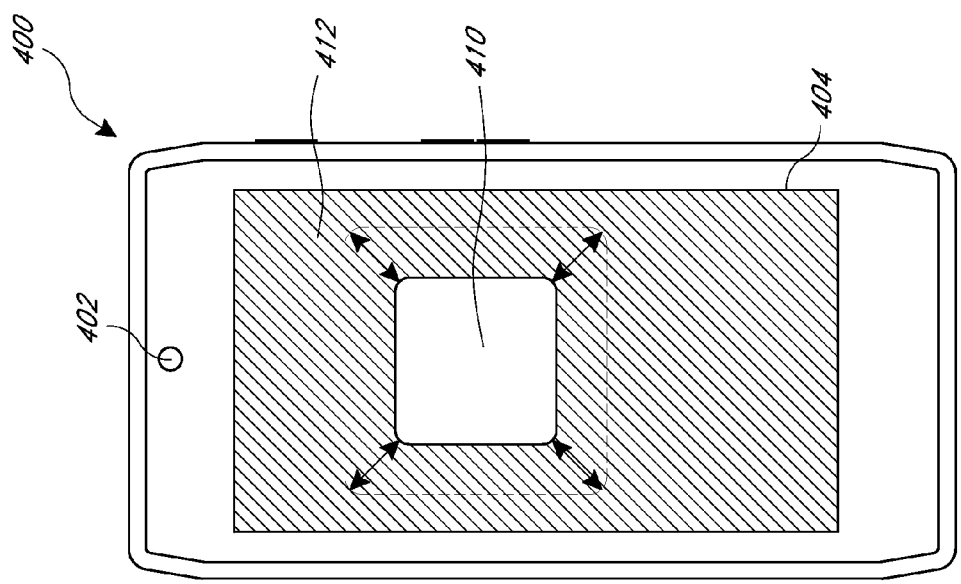

The illumination image 404 of the digital device 400 in FIG. 4C according to another implementation includes a single illumination region 410 that is configured to illuminate white light and cover a portion of the illumination image 404. An average luminance value of the illumination region 410 may be adjusted as in FIGS. 4A-4B. In addition, the size of the illumination region 410 may be adjusted to increase the number of pixels included in the illumination region 410 to increase the overall illumination of the display device. Pixels included in a passive region 412 are configured to have negligible luminance values.

The illumination image 404 of the digital device 400 in FIG. 4D according to another implementation includes a plurality of illumination regions 416a-416c, each of which is configured to illuminate white light and cover a portion of the illumination image 404. Average luminance value of the illumination regions 416a-416c may be adjusted as in FIGS. 4A-4C. In this implementation, the average luminance values of the illumination regions 416a-416c may be adjusted individually or collectively. In addition, the sizes of the illumination regions 416a-416c may be adjusted individually or collectively to optimize the overall illumination of the display device. Pixels included in passive regions 414a-414c outside of the illumination regions 416a-416c are configured to have negligible luminance values.

In some implementations, the illumination image 404 may include one or more illumination regions configured such that pixels included in the illumination regions are configured to preferentially illuminate colored light of a color component (e.g., R, G, or B in RGB space). The pixels may be configured to preferentially illuminate colored light when the intensity of one of the color components is enhanced while intensities of other color components are suppressed such that a human eye perceives the resulting light as having a color. For example, to preferentially illuminate red light, the photodiodes corresponding to green and blue lights may be suppressed such that the color component R has a relatively high value in comparison to the color components G and B.

Figure 4F:
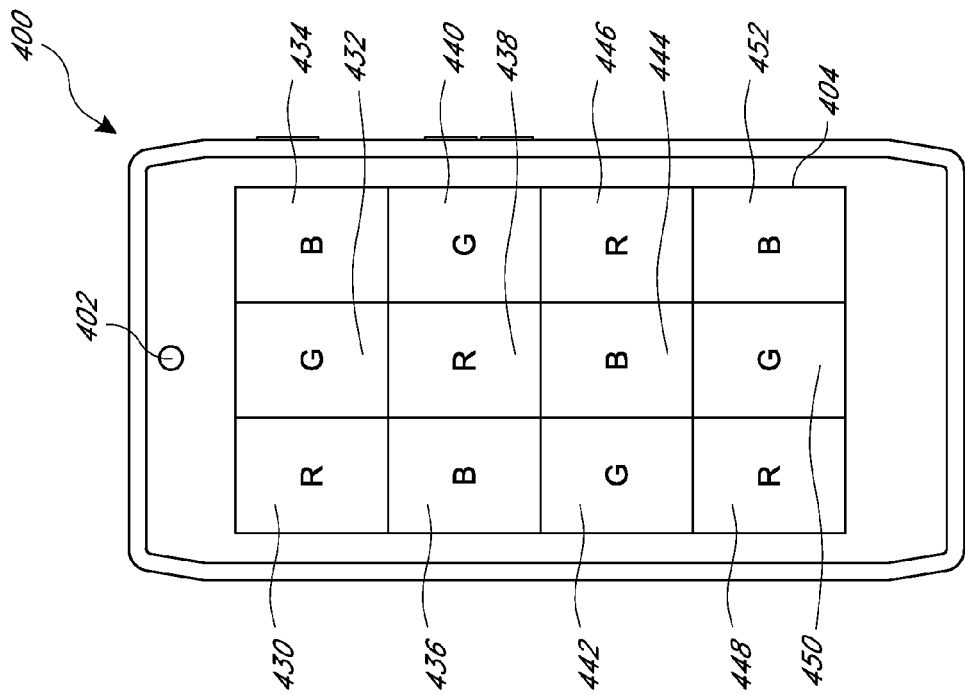
Figure 4E:
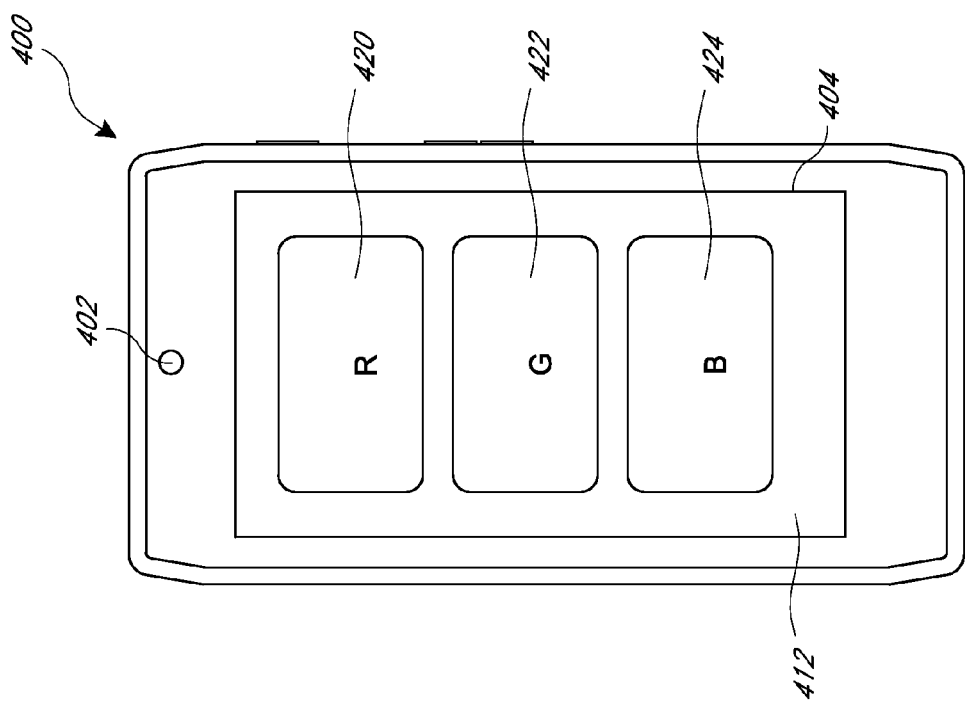

The illumination image 404 of the digital device 400 in FIG. 4E according to one implementation includes a plurality of illumination regions, where each of the illumination regions is configured to preferentially illuminate a colored light and to cover a portion of the illumination image 404. In the illustrated implementation, the illumination image 404 includes three illumination regions 420, 422, and 424, each of which are configured to preferentially illuminate red, green, or blue light, respectively. An average luminance value of each of the individual illumination regions 420, 422, and 424 may be adjusted as in FIGS. 4A-D. By individually adjusting the average luminance value of each of the three illumination regions, whose values are derived preferentially weighed by the color component being preferentially illuminated, a combined illumination having a customizable color mix can be provided for the front-facing camera 402. Pixels included in the passive region 412 are configured to have negligible luminance values.

The illumination image 404 of the digital device 400 in FIG. 4F according to one implementation includes a plurality of illumination regions, where the illumination regions configured to preferentially illuminate different colored light are interlaced and to cover substantially the entire illumination image 404. In the illustrated implementation, the illumination image 404 includes four illumination regions 430, 432, 446, and 448, each of which are configured to preferentially illuminate red light, four illumination regions 432, 440, 442, and 450, each of which are configured to preferentially illuminate green light, and four illumination regions 434, 436, 444, and 452, each of which are configured to preferentially illuminate blue light. An average luminance value of each of the individual illumination regions 430, 432, 434, 436, 438, 440, 442, 444, 446, 448, 450, and 452 may be adjusted as in FIGS. 4A-4E. As in FIG. 4E, by individually adjusting the average luminance value of each of the illumination regions, whose values are derived preferentially weighed by the color component being preferentially illuminated, a combined illumination having a customizable color mix can be provided for the front-facing camera 402. In addition, the interlaced pattern may provide a more even distribution of colored light so as to avoid, for example, different portions of the subject (e.g., a face) being preferentially illuminated with a particular color component The illumination image 404 of the digital device 400 in FIG. 4G according to one implementation includes a plurality of illumination regions, where the illumination regions configured to preferentially illuminate different colored light are distributed within the illumination image 404 and to cover at least a portion of the illumination image 404. In the illustrated implementation, the illumination image 404 includes three illumination regions 460 and 466, each of which is configured to preferentially illuminate red light, two illumination regions 462 and 469, each of which are configured to preferentially illuminate green light, and two illumination regions 464 and 470, each of which are configured to preferentially illuminate blue light. An average luminance value of each of the individual illumination regions 460, 462, 464, 466, 468, and 470 may be adjusted as in FIGS. 4A-4F. As in FIG. 4E, by individually adjusting the average luminance value of each of the illumination regions, whose values are derived preferentially weighed by the color component being preferentially illuminated, a combined illumination having a customizable color mix can be provided for the front-facing camera 402. In addition, the interlaced pattern may provide a non-uniform distribution of colored light so as to provide, for example, different amounts of colored light to different portions of the subject (e.g., a face). Pixels included in the passive region 412 are configured to have negligible luminance values.

Figure 4H:
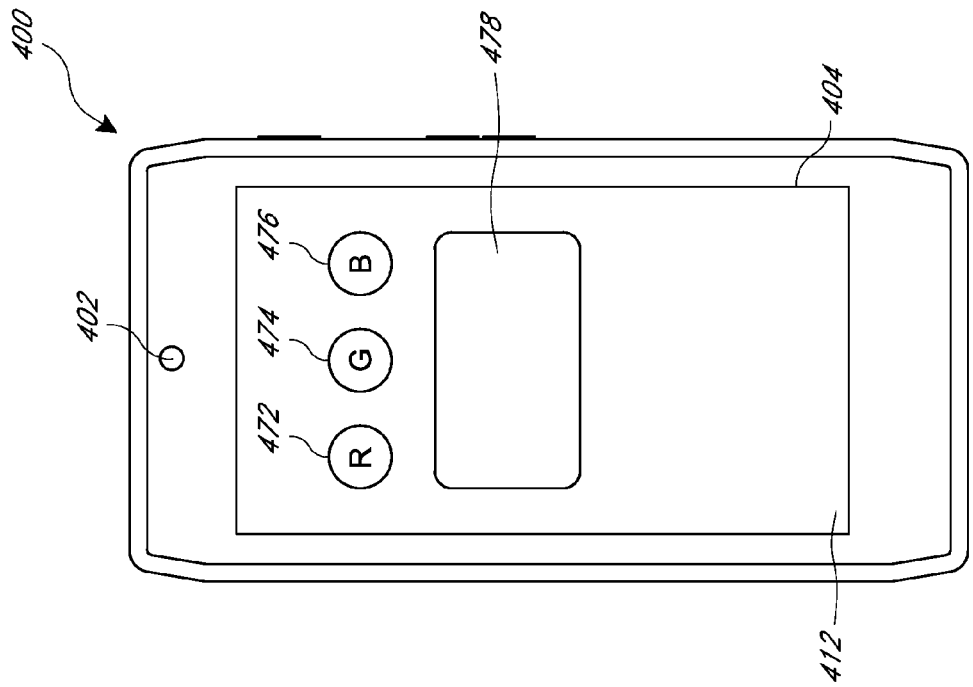
Figure 4G:
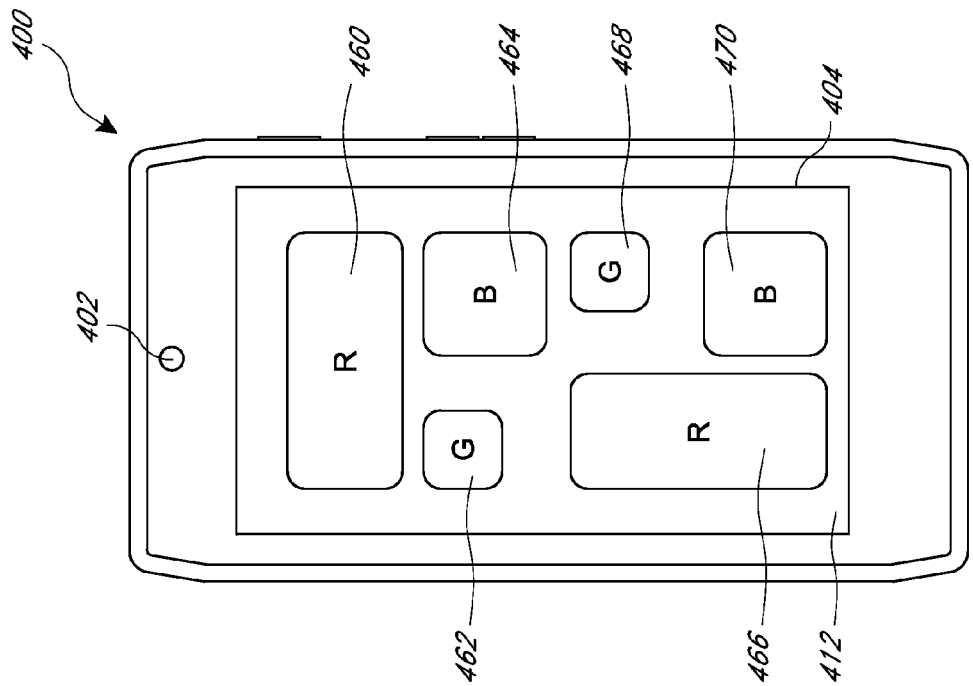

The illumination image 404 of the digital device 400 in FIG. 4H according to one implementation includes a plurality of illumination regions, where some of the illumination regions are configured to preferentially illuminate a colored light while other illumination regions are configured to illuminate white light. In the illustrated implementation, the illumination image 404 includes three illumination regions 472, 474, configured to preferentially illuminate red, green, or blue light, respectively. The illumination image 404 additionally includes an illumination region 478 configured to illuminate white light. Average luminance values of each of the individual illumination regions 472. 474, 476, and 478 may be adjusted as in FIGS. 4A-4G. By individually adjusting the average luminance value of each of the illumination regions 472, 474, and 476, whose values are derived preferentially weighed by the color component being preferentially illuminated, a combined illumination having a customizable color mix can be provided for the front-facing camera 402. In addition, by adjusting the average luminance value of the illumination region 478, additional white light may be provided to increase the general brightness of the captured image. Pixels included in passive region 412 are configured to have negligible luminance values.

In some implementations, the illumination image may include an image captured by the front-facing image sensor. In some implementations, the image captured by the front-facing image sensor may be a preview image for a still image. In other implementations, the image captured by the front-facing camera may be a real-time frame being captured in a video.

Figure 4J:
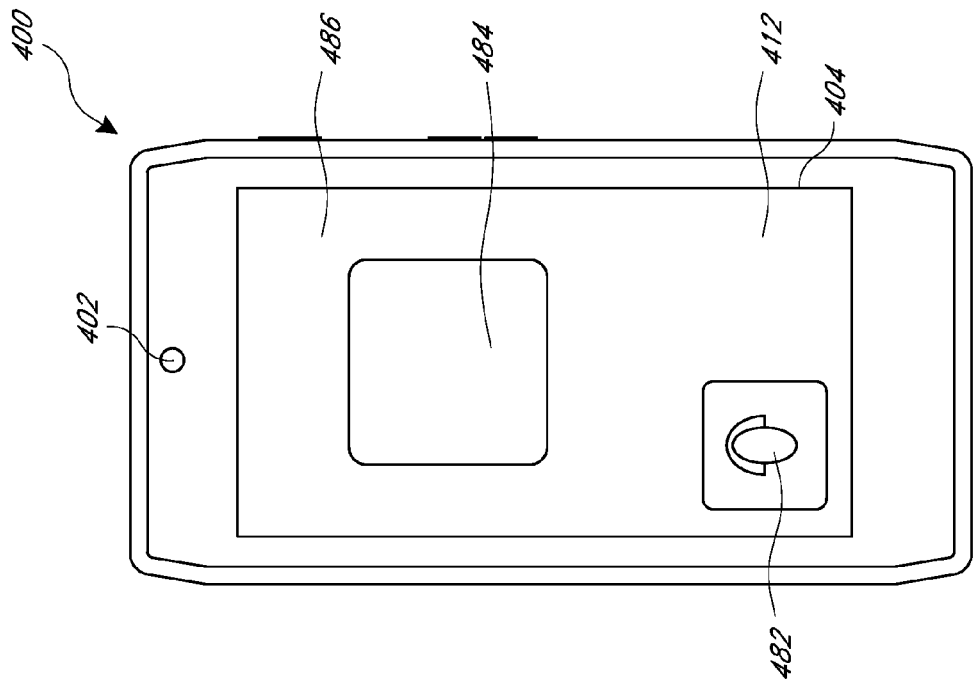
Figure 4I:
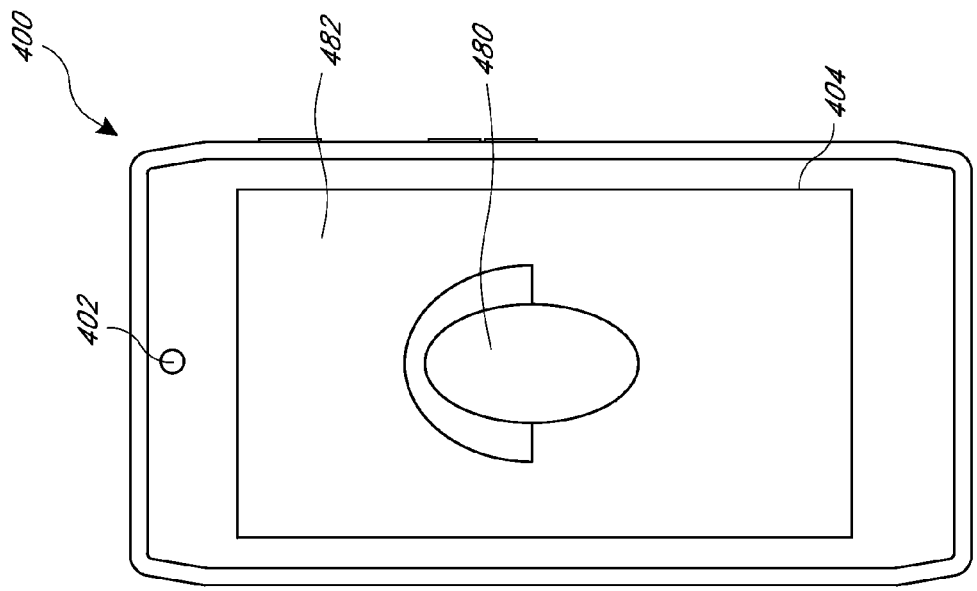

One implementation using the image captured by the front-facing camera itself as an illumination image is depicted in FIG. 4I. The illumination image 404 of FIG. 4I includes an illumination region 482 covering substantially the entire illumination image 404 and includes an image of a user 480 against a background. An average luminance value of the entire illumination image 404 may be adjusted as in FIGS. 4A-4H.

Another implementation using the image captured by the front-facing camera itself as an illumination image is depicted in FIG. 4J. In addition to an illumination region 482 covering a portion of the illumination image 404 comprising an image of a user, the illumination image 404 of FIG. 4J additionally includes an illumination region 484 covering a portion of the illumination image 404 and configured to illuminate white light. An average luminance value of each of the illumination regions 484 and 482 may be adjusted as in FIGS. 4A-4H. Pixels included in the passive region 412 are configured to have negligible luminance values.

Figure 4L:
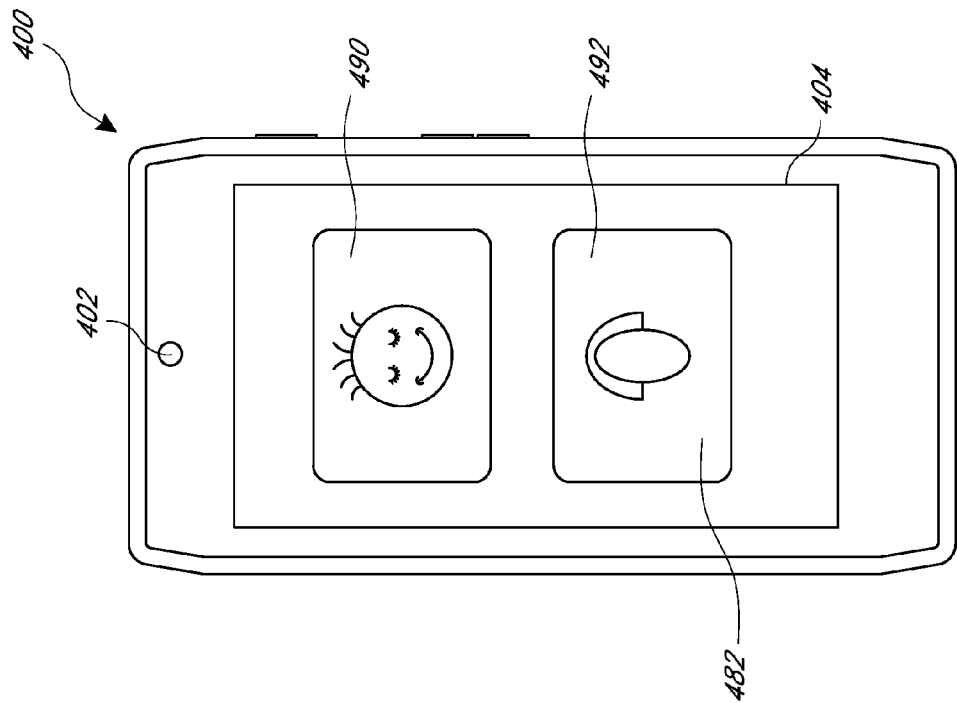
Figure 4K:
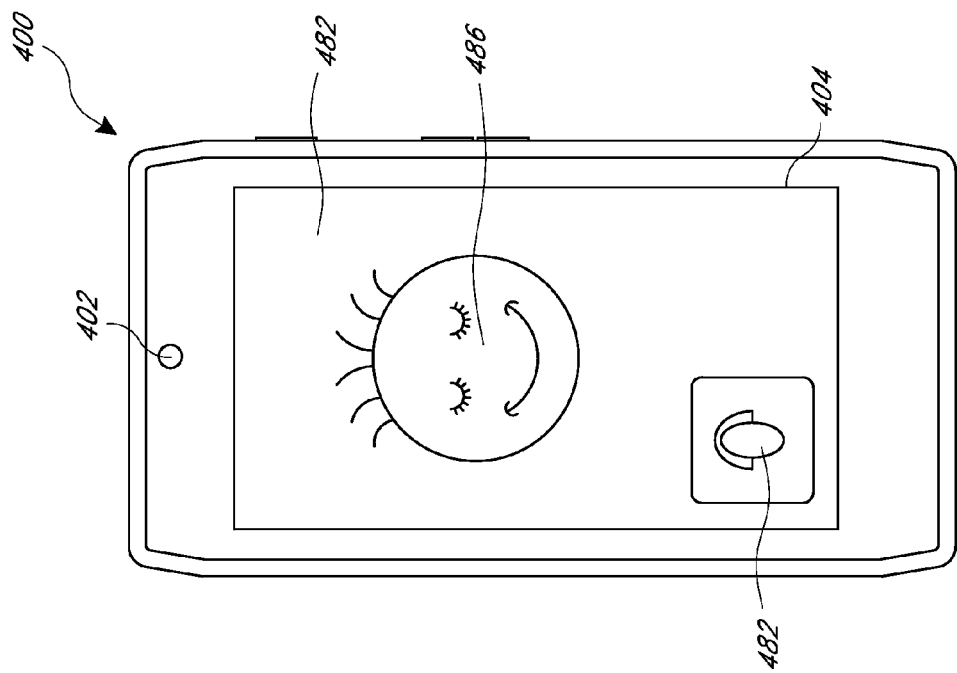

Another implementation using the image captured by the front-facing camera itself as an illumination image is depicted in FIGS. 4K and 4L. In both implementations, in addition to an illumination region 482 covering a portion of the illumination image 404 comprising an image of a user, the illumination images 404 of FIGS. 4K and 4L additionally includes illumination regions 488 and 490 comprising an image transmitted from another device (e.g., of a second user 486) through the network. An average luminance value of each of the illumination regions 482, 488 and 490 may be adjusted as in FIGS. 4A-4J. Pixels included in the passive region 412 in FIG. 4L are configured to have negligible luminance values.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

Clarifications Regarding Terminology

Implementations disclosed herein provide systems, methods and apparatus for using the device's own display to provide an illumination source for front-facing image sensors. One skilled in the art will recognize that these embodiments may be implemented in hardware, software, firmware, or any combination thereof.

In the description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method for capturing one or more digital images of a user using a mobile device including a front-facing image sensor and a touch screen, the method comprising:
   receiving a command to capture the one or more digital images of the user;
   determining that the one or more digital images include at least a face of the user;
   illuminating the user by displaying an illumination image on the touch screen;
   capturing a preview image using the front-facing image sensor;
   adjusting a color of the illumination image based on a comparison between an average chrominance value of the preview image of the user and a target chrominance value to generate an adjusted illumination image; and
   capturing the one or more digital images of the user using the front-facing image sensor while the user is illuminated by the adjusted illumination image displayed on the touch screen.

2. The method of claim 1, wherein a face-detection algorithm is used to determine that the one or more digital images include at least the face of the user.

3. The method of claim 1, wherein the illumination image is based on an even distribution of colored light on the user.

4. The method of claim 3, wherein the illumination image comprises a white color.

5. The method of claim 1, wherein the command comprises a gesture or a motion of the user.

6. The method of claim 1, wherein the adjusted illumination image is based on an even distribution of colored light on the user.

7. The method of claim 1, wherein the illumination image is based on a test frame of the user captured by the front-facing image sensor, the test frame including at least the user's face.

8. The method of claim 7, wherein the test frame is captured using a fixed f-number and exposure time.

9. The method of claim 7, further comprising:
   determining an average chrominance value of the user's face in the test frame;
   determining a difference between the average chrominance value of the user's face and a chrominance criteria; and
   determining the color of the illumination image based on the difference.

10. The method of claim 1, further comprising:
    determining an average luminance value of the user's face;
    determining a difference between the average luminance value and a target luminance value; and
    adjusting an intensity of the illumination image displayed on the touch screen based on the difference.

11. The method of claim 1, further comprising:
    adjusting an intensity of the illumination image displayed on the touch screen based on a distance between the user and the mobile device.

12. The method of claim 1, wherein the illumination image is provided by the user.

13. The method of claim 1, wherein the illumination image comprises a stored image of the user.

14. A non-transitory computer-readable medium configured to store instructions that, when executed by a processor of a mobile device including a front-facing image sensor and a touch screen, causes the mobile device to perform operations comprising:
    receiving a command to capture the one or more digital images of the user;
    determining that the one or more digital images include at least a face of the user;
    illuminating the user by displaying an illumination image on the touch screen;
    capturing a preview image using the front-facing image sensor;
    adjusting a color of the illumination image based on a comparison between an average chrominance value of the preview frame of the user and a target chrominance value to generate an adjusted illumination image; and
    capturing the one or more digital images of the user using the front-facing image sensor while the user is illuminated by the adjusted illumination image displayed on the touch screen.

15. The non-transitory computer-readable medium of claim 14, wherein execution of the instructions causes the mobile device to perform operations further comprising:
    invoking a face-detection algorithm to determine that the one or more digital images include at least the face of the user.

16. The non-transitory computer-readable medium of claim 14, wherein the illumination image is based on an even distribution of colored light on the user.

17. The non-transitory computer-readable medium of claim 16, wherein the illumination image comprises a white color.

18. The non-transitory computer-readable medium of claim 14, wherein the command comprises a gesture or a motion of the user.

19. The non-transitory computer-readable medium of claim 14, wherein the adjusted illumination image is based on an even distribution of colored light on the user the preview frame of the user.

20. The non-transitory computer-readable medium of claim 14, wherein the illumination image is based on a test frame of the user captured by the front-facing image sensor, the test frame including at least the user's face.

21. The non-transitory computer-readable medium of claim 20, wherein the test frame is captured using a fixed f-number and exposure time.

22. The non-transitory computer-readable medium of claim 20, wherein execution of the instructions causes the mobile device to perform operations further comprising:
    determining an average chrominance value of the user's face in the test frame;
    determining a difference between the average chrominance value of the user's face and a chrominance criteria; and
    determining the color of the illumination image based on the difference.

23. The non-transitory computer-readable medium of claim 14, wherein execution of the instructions causes the mobile device to perform operations further comprising:
    determining an average luminance value of the user's face;
    determining a difference between the average luminance value and a target luminance value; and
    adjusting an intensity of the illumination image displayed on the touch screen based on the difference.

24. The non-transitory computer-readable medium of claim 14, wherein execution of the instructions causes the mobile device to perform operations further comprising:

adjusting an intensity of the illumination image displayed on the touch screen based on a distance between the user and the mobile device.

25. The non-transitory computer-readable medium of claim 14, wherein the illumination image is provided by the user.

26. The non-transitory computer-readable medium of claim 14, wherein the illumination image comprises a stored image of the user.

27. A mobile device for capturing one or more digital images of a user, the mobile device comprising:
   a front-facing image sensor;
   a touch screen;
   a processor; and
   a memory configured to store instructions that, when executed by the processor, causes the mobile device to:
   receive a command to capture the one or more digital images of the user;
   determine that the one or more digital images include at least a face of the user;
   illuminate the user by displaying an illumination image on the touch screen;
   capture a preview image using the front-facing image sensor;
   adjust a color of the illumination image based on a comparison between an average chrominance value of the preview frame of the user and a target chrominance value to generate an adjusted illumination image; and
   capture the one or more digital images of the user using the front-facing image sensor while the user is illuminated by the adjusted illumination image displayed on the touch screen.

28. The mobile device of claim 27, wherein execution of the instructions causes the mobile device to:
   invoke a face-detection algorithm to determine that the one or more digital images include at least the face of the user.

29. The mobile device of claim 27, wherein the illumination image is based on an even distribution of colored light on the user.

30. The mobile device of claim 29, wherein the illumination image comprises a white color.

31. The mobile device of claim 27, wherein the command comprises a gesture or a motion of the user.

32. The mobile device of claim 27, wherein the adjusted illumination image is based on an even distribution of colored light on the user.

33. The mobile device of claim 27, wherein the illumination image is based on a test frame of the user captured by the front-facing image sensor, the test frame including at least the user's face.

34. The mobile device of claim 33, wherein the test frame is captured using a fixed f-number and exposure time.

35. The mobile device of claim 33, wherein execution of the instructions causes the mobile device to:
   determine an average chrominance value of the user's face in the test frame;
   determine a difference between the average chrominance value of the user's face and a chrominance criteria; and
   determine the color of the illumination image based on the difference.

36. The mobile device of claim 27, wherein execution of the instructions causes the mobile device to further:
   determine an average luminance value of the user's face;
   determine a difference between the average luminance value and a target luminance value; and
   adjust an intensity of the illumination image displayed on the touch screen based on the difference.

37. The mobile device of claim 27, wherein execution of the instructions causes the mobile device to further:
   adjust an intensity of the illumination image displayed on the touch screen based on a distance between the user and the mobile device.

38. The mobile device of claim 27, wherein the illumination image is provided by the user.

39. The mobile device of claim 27, wherein the illumination image comprises a stored image of the user.

* * * * *